United States Patent [19]
Fernandez

[11] Patent Number: 5,360,377
[45] Date of Patent: Nov. 1, 1994

[54] EXTRA SHORT TELESCOPIC TRANSMISSION SHAFT WITH SHAFT SECTION DIAMETERS GREATER THAN COUPLING FORK DIAMETERS

[75] Inventor: Jose G. Fernandez, Sao Paulo, Brazil

[73] Assignee: Mercedes-Benz Do Brasil S.A., Sao Paulo, Brazil

[21] Appl. No.: 910,101

[22] PCT Filed: Nov. 8, 1991

[86] PCT No.: PCT/BR91/00024
§ 371 Date: Jul. 8, 1992
§ 102(e) Date: Jul. 8, 1992

[87] PCT Pub. No.: WO92/08905
PCT Pub. Date: May 29, 1992

[30] Foreign Application Priority Data
Nov. 8, 1990 [BR] Brazil .................. PI9005668

[51] Int. Cl.⁵ .............. F16C 3/03; F16D 3/06
[52] U.S. Cl. .................. 464/162; 277/212 FB; 464/117; 464/133
[58] Field of Search .......... 464/117, 133, 162, 169; 277/212 FB; 403/359

[56] References Cited

U.S. PATENT DOCUMENTS

| | | | |
|---|---|---|---|
| 2,761,295 | 9/1956 | Davis | 464/162 |
| 3,754,411 | 8/1973 | Orain | 464/162 X |
| 4,548,591 | 10/1985 | Haldric et al. | 464/117 X |

FOREIGN PATENT DOCUMENTS

| | | | |
|---|---|---|---|
| 1265193 | 5/1961 | France | 464/162 |
| 59-99122 | 6/1984 | Japan | 464/162 |
| 2-204132 | 8/1990 | Japan | 464/162 |
| 2042126 | 9/1980 | United Kingdom | 464/162 |

Primary Examiner—Daniel P. Stodola
Attorney, Agent, or Firm—Beveridge, DeGrandi, Weilacher & Young

[57] ABSTRACT

An extra short transmission shaft has two telescopically fitted tubular shaft sections (6,7) having diameters (D',D) substantially greater than the basic diameters of coupling forks (8,9) associated with respective ends of the shaft sections. The increased diameters of the shaft sections ensure a greater torque transmitting contact area between meshed teeth formed on such sections, this strengthening the coupling formed thereby and/or permitting the length of the meshed teeth, and thus of the shaft itself, to be reduced to a minimum without unduly affecting the coupling strength. Preferably, each of the coupling forks is integral with the free end of its respective shaft section.

7 Claims, 1 Drawing Sheet

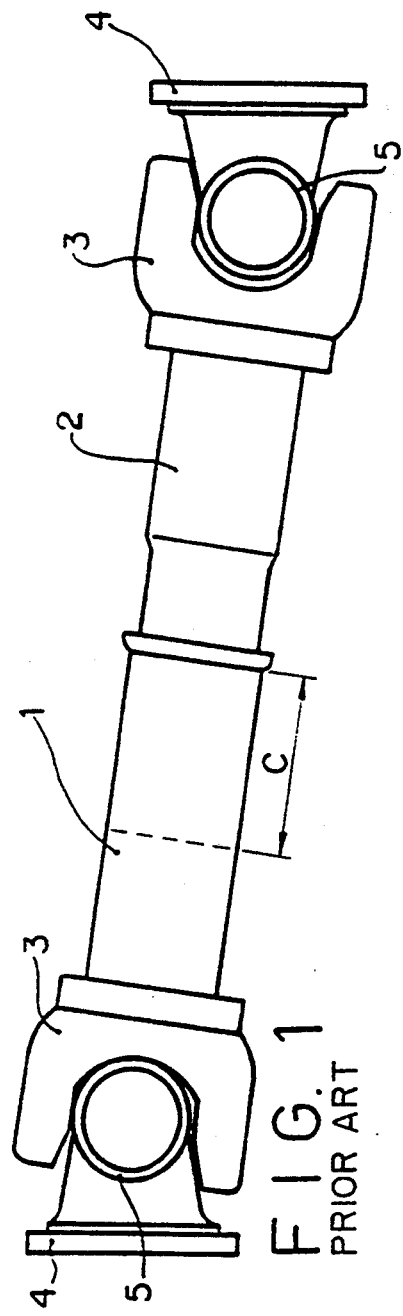
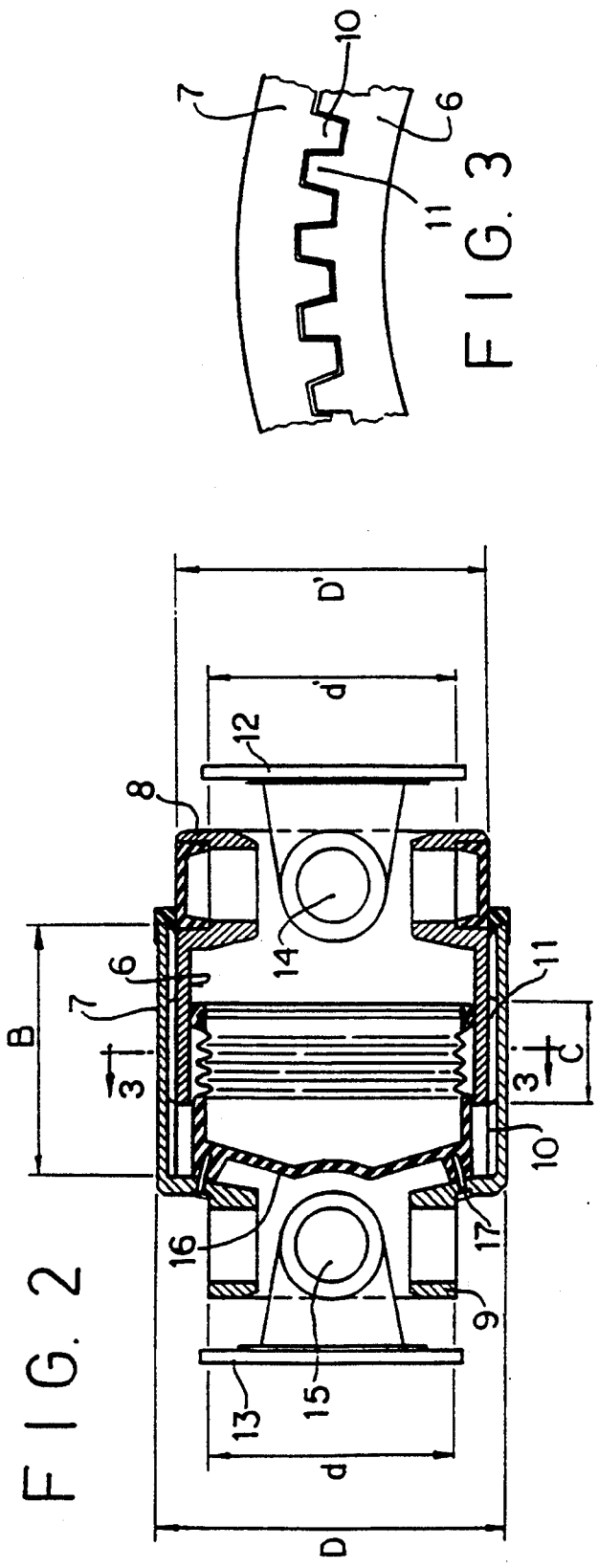

EXTRA SHORT TELESCOPIC TRANSMISSION SHAFT WITH SHAFT SECTION DIAMETERS GREATER THAN COUPLING FORK DIAMETERS

BACKGROUND OF THE INVENTION

The present invention refers to an extra short transmission shaft.

Conventional transmission shafts normally comprise a tubular section and a solid bar telescopically fitted into the tubular section. Longitudinal flutes or teeth are machined in part of the extension of the solid bar, which cooperate or mesh with corresponding flutes or teeth machined on the inner surface of the tubular section so as to permit relative longitudinal movement therebetween while ensuring transmission of rotary movements.

Respective coupling forks are connected to the free ends both of the tubular section and of the solid bar, the forks being solid and dimensioned to be sufficiently robust to support forces and stresses developed during use. They are thus relatively large and heavy.

The coupling forks are connected at their free ends to respective coupling flanges or forks by means of interposed crossheads that are articulated about orthogonal gudgeon pins so as to form a cardan.

One of the coupling flanges may be coupled to a drive shaft component whereas the other may be connected to a driven component, such as a differential, to permit the transmission of power and torque.

Such coupling devices are used to connect non-aligned intercepting axles or shafts, that is to say, shafts being permanenty angled with respect to each other.

Shafts in general are forced to undergo continuous stress inversions which, within a relatively short period of use, may lead to sudden rupture due to fatigue. Apart from this, extreme pressure is applied to the bearings which causes overheating and sometimes more serious problems.

Problems of such a nature that are found in the above type of mechanism are caused, amongst others, by differences of level between the drive and driven components due to the small axial relative movement between the sections of the transmssion shaft, as well as to the development of elevated torsional stresses therebetween concentrated over the small area of contact between the torque transmitting flutes or teeth.

In view of such elevated torque in a relatively small contact area, that is to say, the surfaces of relative movement of the flutes or teeth on the tubular sections, the specific pressure on the flanks of the teeth frequently attains such a magnitude that, instead of sliding, the flanks become rigid and jam whereby the shaft sections begin to shift together as a single part and transmit such movement also to the drive component, for example, the engine which is supported on mounting blocks. This movement causes mechanical misadjustments that produce trepidations, vibrations and irregularities in the acceleration control of the engine.

Many studies have been made with a view to diminish or even eliminate the friction—and the consequent jamming—between the teeth of the transmission shaft sections. However, up to the moment satisfactory results have not been achieved.

SUMMARY OF THE INVENTION

According to the present invention, this objective is attained by an extra short transmission shaft comprising two shaft sections telescopically fitted together to permit relative longitudinal movement and so interengaged as to ensure transmission of rotation therebetween, each said shaft section having one free end, and two coupling forks associated with the free ends of the shaft sections, the diameters of said shaft sections being substantially greater than the basic diameters of the coupling forks.

Each coupling fork is preferably integrally formed with the respective free end of a respective one of the shaft sections which are most suitably tubular.

As in the prior art, the interengagement between the shaft sections is preferably provided by corresponding longitudinal teeth along parts of the lengths of the shaft elements.

It will be understood that when the shaft sections have larger diameters than the coupling forks in accordance with the invention and in contrast to the prior art where they are smaller, the means interengaging the two shaft sections (the longitudinal teeth in the preferred arrangement), it is possible to increase the area of torque transmission contact (the flanks of a greater number of teeth in the preferred arrangement). This not only strengthens the coupling as a whole but also permits a considerable shortening of the transmission shaft without unduly reducing strength.

In order to prevent the penetration of dirt into the interior of the transmission shaft of the invention, there is preferably an inner substantially tubular seal element having a closed end fixed to one tubular shaft section and also a peripheral portion radially pressed against the inner surface of the other tubular shaft section.

The seal element may have a bellows type configuration and its peripheral portion may comprise a sealing lip that abuts the inner surface of the above mentioned other shaft element. The seal element is conveniently made of synthetic material, preferably an elastomer.

Such a transmission shaft has demonstrated excellent results under load, especially in vehicles having rear longitudinally mounted engines, which, after installation of the gear box, have a very reduced space between the gear box and the differential shaft.

BRIEF DESCRIPTION OF THE DRAWINGS

The invention will now be described in more detail with respect to a preferred exemplary embodiment. The drawings show:

FIG. 1—a side view of a conventional transmission shaft;

FIG. 2—a longitudinal central section through a transmission shaft according to the invention; and FIG. 3—a section taken along the line 3—3 in FIG. 2 showing the mesh between the longitudinal teeth.

DETAILED DESCRIPTION

FIG. 1 shows a transmission shaft known in the art. It comprises a tubular section 1 and a telescopically axially fitted solid bar 2. An extension—indicated in FIG. 1 by the letter C—of the tubular section is provided with inner longitudinal fluting (not shown) that cooperates with corresponding external fluting on the outer surface of the solid bar. The tubular section 1 and the solid bar 2 may be relatively shifted longitudinally with a view to compensate spacial variations between the drive and driven components of, for example, automobiles, where the problems previously mentioned can occur.

At the free ends of both the tubular section 1 and of the solid bar 2 there are respective coupling forks 3 which are articulated to respective end coupling flanges 4 through crossheads with bearings 5 by means of transverse orthogonal gudgeon pins (not shown), thereby defining a cardan.

The tubular section 1 and the solid bar 2 of this transmission shaft have diameters substantially smaller than the basic diameters of the coupling forks 3.

FIG. 2 shows a transmission shaft according to the present invention. It comprises two internal and external tubular shaft sections 6 and 7, respectively, which are telescopically fitted to each other, and has respective end coupling forks 8 and 9 which are integrally formed with their respective shaft sections. The diameters D', D of the shaft sections 6 and 7 are greater than the respective basic diameters d', d of the coupling forks 8 and 9.

Shaft section 7 is provided along an extension thereof indicated by the letter B with inner longitudinal teeth 10, whereas shaft section 6 is provided along an extension C thereof with corresponding outer longitudinal teeth 11 in a mesh that permits relative longitudinal movements but ensures the transmission of rotation between sections 6 and 7. Obviously the fact that the diameters D' and D of shaft sections 6 and 7 are larger than diameters of shaft sections 1 and 2 of the prior art shaft means that a greater number of teeth 10 and 11 will be present, this increasing the strength of the coupling.

Coupling forks 8 and 9 are respectively coupled to end coupling flanges 12 and 13 through articulated crossheads 14 and 15.

The transmission shaft of the invention is also provided with a cup shaped seal element 16 that cooperates internally with the tubular shaft sections 6 and 7 and is preferably made of a synthetic preferably elastic material such as, for example, an elastomer. It is fixed internally to outer tubular shaft section 7 by means of, in the present case, screws 17 and extends into the inner shaft section 6 where it has a sealing lip compressed against the inner surface of section 6 so as to guarantee sealing from the outside and thus prevent dirt from reaching the inside of the transmission shaft. A part of the seal element 16 is of a bellows formation so as to permit expansion and compression thereof and thus adjustment to any relative longitudinal shifting between tubular shaft sections 6 and 7.

Finally, FIG. 3 is a cross section along line A—A of FIG. 2, showing the mesh between teeth 10 and 11.

It will readily be observed that the increased diameter of the tubular shaft sections 6 and 7 compared with the diameters of corresponding components 1 and 2 of the prior art transmission shaft results in there being a greater number of meshing teeth 10 and 11 which means a considerable increase in the area of tooth flank contact between the tubular sections. This ensures a torque transmission coupling that is substantially stronger than that obtained in the conventional shaft. More specifically, the diameters of shaft components 1 and 2 of the prior art shaft of FIG. 1 are considerably smaller than the basic diameters of the coupling forks of the cardan whereas precisely the contrary is true in the case of the present invention where D and D' are considerably greater than the basic fork diameters d and d'.

A transmission shaft of the type described and illustrated may have a very reduced length and does in fact—in the illustrated embodiment—have its length reduced to an absolute minimum. This is not possible with the prior art arrangement without reducing the strength of the coupling between the shaft components to an unacceptable minimum since the teeth become too short and consequently the tooth flank torque transmission contact area is unacceptably reduced. In the case of the present invention, although the teeth are shortened, the increased diameter of the shaft components with a correspondingly increased number of teeth permits one to maintain an acceptable total tooth flank torque transmission contact area. The shaft may thus be installed between a drive mechanism and the driven mechanism in a correspondingly reduced space, for example, 300 mm, yet providing a greater transmission contact area with improved torque transmission characteristics.

I claim:

1. Extra short telescopic transmission shaft comprising two shaft sections (6,7) displaceable one with respect to the other, each said shaft section having one free end and one coupling fork (8,9) integrally formed with said respective shaft section (6,7), said shaft sections (6,7) being provided along at least part of their lengths with corresponding longitudinal teeth (11,10), said teeth (11,10) being meshed to permit said relative longitudinal movement between said shaft sections and to ensure transmission of rotation therebetween, each of said shaft sections (6,7) having a diameter (D',D) which is greater than the diameter (d',d) of its respective coupling fork (8,9).

2. Transmission shaft according to claim 1, in which each of said shaft sections (6,7) is tubular.

3. Transmission shaft according to claim 1, in which each said coupling fork (8,9) is articulated through a respective crosshead (14,15) to a respective end coupling flange (12,13).

4. Transmission shaft according to claim 1, further comprising an inner substantially tubular seal element (16) having a closed end fixed to one (7) of said tubular sections and having a peripheral portion radially pressed against the inner surface of the other (6) tubular section.

5. Transmission shaft according to claim 4, in which a section of said tubular seal element (16) has a bellows type configuration and said peripheral portion comprises a sealing lip that abuts said inner surface of said other (6) tubular section so as to accompany relative longitudinal movements between said tubular sections (6,7).

6. Transmission shaft according to claim 4, in which said seal element (16) comprises synthetic material.

7. Transmission shaft according to claim 4, in which said seal element (16) comprises an elastomer.

* * * * *